CROSS REFERENCE

Patented Apr. 8, 1952

2,592,345

UNITED STATES PATENT OFFICE 2,592,345

METHOD FOR PRODUCING LIGHTWEIGHT CONCRETE

August Schnell and Alexander Bosshard, Zurich, Switzerland, assignors to Durisol Inc., New York, N. Y., a corporation of Delaware No Drawing. Application August 25, 1947, Serial No. 770,550

7 Claims. (Cl. 106—93)

This invention relates to a method for producing moisture proof light-weight concrete containing mineralized organic fibrous material.

According to known methods of producing porous light-weight concrete, vegetable fibres, particularly saw dust and like materials, are mixed with cement, gypsum and other mineral binding substances. It is also known to provide for mineralization of the fibres before binding them, by boiling the fibrous material in alum or other salt solutions, or combinations of such solutions and following drying of the fibres. According to more recent methods, a superficial mineralization of the fibres is obtained by cold impregnation of the fibres with solutions of aluminum sulfates or heavy metal sulfates, by adding lime water, inert mineral substances and the binding agent together with or after impregnation.

Those known methods of producing porous concrete have various disadvantages. If the fibrous material is not impregnated, this material is not sufficiently protected against putrefaction or decomposition, and moreover does not adhere to the binding substance. The hot impregnating methods are uneconomical owing to the required heat and their long lasting drying period. The methods using cold impregnated fibres yield very irregular products or require a very high proportion of cement, so that the products become uneconomical, provide insufficient thermic insulation and act favorably when exposed to the moisture content in the air.

These disadvantages are due to the fact, that the sulfate solutions, even when used in the presence of a neutralizing agent, as well as the ratio of water and cement, greatly affect the setting of the cement. The not neutralized sulfate combines with the free lime in the cement, disturbs the chemical equilibrium of the cement and causes irregular setting. The neutralizing agents furnish soluble sulfates which unfavorably affect the cement. Barium salts heretofore used as neutralizing agents furnish theoretically insoluble substances, but they are unreliable when used in the cold state and are moreover poisonous.

The object of the present invention is to provide an improved method for producing light-weight concrete which avoids the mentioned inconveniences.

The method according to our invention makes use of the phenomenon that solutions of sulfates, particularly of aluminum sulfate, produce watery slimy gels when they are mixed with bases; such gels may even harden and link very well with the cement. By judicious concentration and dosing of the solution of sulfate, and correctly timing the process of impregnation, so that a substantial layer of solution adheres to the fibrous material, this layer will be transformed into a layer of gel when adding suitably concentrated lime-milk, cement-milk or another basic liquid. Incorrect dosing, however, prevents the formation of a gel coating on the fibres and may produce a dangerous sulfate containing insulating layer preventing linkage of the cement with the fibrous material.

According to the invention the organic fibrous material, particularly such as saw dust, wood chippings or shavings, is mineralised by mixing it with a solution of sulfate, particuluarly aluminum sulfate or other heavy metal sulfate and then a base such as lime milk is added. In the moment of the appropriate viscosity of the produced gel, that is a few minutes after adding the base, cement is added to the mixture. In this manner, the finally mineralized fibres of the fibrous material when considered in transverse section, shows a structure which will be subdivided in several zones or layers of different character. The outermost zone is formed by pure cement, then follows a layer in which cement is mixed with the hardened gel, further inwardly there is a thin layer of hardened gel, then comes a zone in which the gel is mixed with or has penetrated into mineralized fibre portions, and finally the innermost portion of more or less impregnated fibre material. This latter is completely protected against decomposition.

By means of this method, it is possible to even use fibrous material which contains substances having a destroying action on the cement and which cannot be used to manufacture light-weight concrete by heretofore known methods, such as for example sugar cane fibres. In accordance with our improved process, we use in such a case cement milk for producing the coating of gel on the fibres, while the addition of cement as binding agent is only made after the gel coating has dried somewhat. The cement contained in the cement milk used for the coating of the fibres is destroyed as such, but the products of its decomposition mixed with the gel form a hardening intermediate layer between the fibres and the binding cement, which layer assists in the binding action but prevents further destruction of the added binding cement.

An important factor in establishing the mixture of fibrous material, sulfate solution, basic agent and binding cement is the correct amount of moisture content. The addition of water depends on the kind and on the size of the fibrous material. This latter is calibrated and the various sizes are mixed and the addition of water to the mixture must be so calculated that when the mixture has the correct plasticity for molding the desired profiles of light-weight concrete bodies, these bodies harden in a predetermined time when exposed to a predetermined temperature. A portion only of the wetting liquid is directly used for hydration of the cement; another part of moisture is retained in the fibrous material and serves to maintain a certain moisture content within the mixture during the hardening process.

The improved method according to the invention provides for the manufacture of light-weight concrete bodies having acute angles, by slightly compressing the mixture in profiled molds and maintaining the slight pressure for a short period. After removing the body from the mold its volume slightly increases due to elasticity of the pressed mixture. Owing to this slight increase of volume there are formed a great number of macropores in the molded body, in addition to the already existing smaller pores in the fibrous material. These macropores are filled with air and are an important feature of the finished products; they have a favorable action on the process of drying of the molded bodies and since they are filled with air, they act as insulation against heat and cold. The desired elasticity and plasticity of the mixture to be molded can be determined by an appropriate sizing mixing of the fibrous materials, which in certain cases will be broken, squeezed or treated in crushing mills.

In order to fill the molds by tamping or pressing the mixture into them, it may be advantageous for certain profiles of molded bodies to mechanically vibrate the material into the molds, or to combine the vibration with a mechanical pressing. The vibration method usually requires a more plastic material than the mere tamping of the material in the molds by hand. The increase of plasticity could be obtained by increasing the addition of water or the addition of cement; but a great moisture content reduces the quality of the product, and the increase of cement is expensive and thermically disadvantageous. Therefore when a greater elasticity or plasticity is required, we use mineral additions or greasing means, such as slate powder which is not detrimental for the cement in the mixture.

In the preferred practice of our invention we use wood chippings or shavings as fibrous material. These chippings or shavings are cleaned of all foreign matter which would be detrimental to the action of the cement, and then separated according to sizes.

If the material is too long or too coarse, it is cut or crushed mechanically or by hand. We also may use certain grass as fibrous material, and in case such material is too stiff, it will be squeezed between rollers.

The prepared fibrous material is filled in a mixing drum, and the various sizes of material are mixed in such proportion that the required amount of water for obtaining a molding mixture of correct plasticity is 50 to 70% of the weight of the cement to be added. With this proportion the produced light-weight concrete, when correctly mixed and worked, hardens in a closed room at 18° centigrade in 4 to 6 days to a degree so as to be capable of being handled.

The fibrous material placed in the drum is continuously agitated and a 2.1% concentration of aluminum sulfate solution is added until the material feels moist when touched. For 100 kilograms of wood chippings this requires 60 to 80 litres of sulfate solution. When a rigorously uniform moistening of the fibrous material has been obtained the basic solution is added into the drum. When lime milk is used, we add 12 to 15 litres of liquid with a content of about 10% of active calcium oxide for 100 litres of aluminum sulfate solution. This amount of lime milk is sufficient for producing the necessary layer of gel on the fibrous material and cannot create any harmful isolating coating on the surface of the fibres. The amount of aluminum sulfate solution is moreover so determined, that the content of gypsum is not increased above the admissible gypsum content of normal cements. Continuing thorough mixing of the ingredients in the revolving mixing drum, the moment of the greatest viscosity of the produced gel coating will be reached in about 5 minutes and then the cement is added. When wood chippings are used as fibrous material the amount of cement for producing a quality of concrete having a fair degree of resistance is 130 to 140 kilograms for 100 kgs. of wood chippings.

With the materials and liquids so far added into the mixing drum the moisture content is not sufficient for obtaining the required plasticity of the material and water is added until the desired consistency is reached, the total amount of liquid in the mixture being from 50 to 70% of the weight of the added cement.

It may happen that fibrous material is used which is slightly fungous; in this case the impregnation of the material is made by adding a solution of ferrous sulfate instead of aluminum sulfate; if necessary the fibrous material may be desinfected previously by means of a solution of ferric chloride.

When fibrous material is used which contains substances, such as saccharides or starch, which are detrimental to cement, we replace lime milk by an increased amount of cement milk and a short drying period is included before adding the binding agent, to allow for the formation of a protective coating on the fibrous material which prevents further action of the saccharides or starch contained in the fibres on the subsequently added binding cement.

We may also use palm leaves or alpha grass as fibrous material; in the natural condition the fibres of such materials are protected by a waxy coating which must be removed before the material can be used to produce light-weight concrete. This is done by a saponification process, for example by an alkaline lye.

After the various materials have been mixed in the mixing drum as above described, to obtain the desired plastic condition, the drum is discharged and the material tamped into metallic molds. When the mold has been filled, the material therein is subjected to slight pressure, either by resilient pressure bars or by rigid pressing devices operated by eccentrics. The slight pressure is maintained for about 3 minutes and then the mold is removed from the molded body and the latter is carried on a supporting plate to the drying room.

The elasticity of the molded body has been so predetermined by appropriate mixture of fibrous materials of different sizes or of different brands, that after removing the compression pressure and the lateral boardings of the mold the linear elongation of the material in the direction opposite to the compression pressure is about 3 to 5%. This results in an extremely favorable porosity of the molded bodies.

When the molds are to be filled by mechanical vibration instead of tamping the material by hand, the molding material must be rendered more plastic by replacing 8 to 10% of the cement added into the mixing drum by a suitable mineral lubricant or greasing agent such as slate powder of similar fineness as the cement. Also when tamping the material by hand into the molds, it may be advantageous in some cases, to add slate powder to the mixture in the mixing drum.

When filling the molds by vibration, it is advantageous to finally compress the molded mass by means of a stamp to a predetermined size, because also upon vibration filling of the mold, there will occur an increase of volume after the mold is removed from the molded body.

The molded bodies removed from the molds are stored in closed drying rooms until they have hardened to an extent which will permit handling. This preliminary hardening process can be accelerated by addition of chemical hardening agents, or by the action of steam, gas, or heated air, or by direct or indirect electrical heating.

When the molded bodies have sufficiently hardened, they are carried to an open or covered storing place for final hardening until they can be used as elements of building structures.

The light-weight concrete elements produced as described can be brought to exact dimensions by grinding or milling operations, whereby exceedingly identical prefabricated building elements can be produced which are suitable for establishing dry masonry structures.

Various changes and modifications may be made in the practice of our invention without departing from the principle or spirit thereof, by adding customary practice and established knowledge of the art to the present disclosure, and the scope of the appended claims is not to be regarded as limited except as specified therein.

We claim:

1. The method of producing light-weight concrete from reduced organic fibrous material and a calcium-containing cement which comprises at least partially impregnating the particles of the fibrous material with an aqueous solution of a heavy-metal sulfate, mixing the impregnated fibrous material with a basic aqueous medium which will react with the sulfate to form a gel, permitting the basic aqueous medium to remain in contact with the impregnated fibrous material until it has reacted with the sulfate taken up by the fibrous material and forms a viscous gel on the surface of the particles of fibrous material, then, while the gel is still in a viscous state, mixing the fibrous material with a calcium-containing cement, the amount of the cement being between about 130 to 140%, by weight, of the amount of fibrous material, and the total amount of water added to the mixture being between 50 and 70% by weight of the cement, whereby the cement adheres to the viscous gel coating of the fibrous material and calcium compounds of the cement penetrate the fibrous material, molding the mixture, and permitting the molded product to harden to a rigid porous structure.

2. The method defined in claim 1 in which the molded mixture is compressed and the pressure is released before the molded mixture has hardened to permit an elastic increase in volume.

3. The method defined in claim 1 in which the heavy-metal sulfate is aluminum sulfate.

4. The method defined in claim 1 in which the heavy-metal sulfate is ferrous sulfate.

5. The method defined in claim 1 in which the heavy-metal sulfate is aluminum sulfate, the basic liquid is milk of lime, and the ratio of milk of lime to aluminum sulfate is equivalent to between 12 and 15 liters of milk of lime to 100 liters of aluminum sulfate of 2.1% concentration.

6. The method defined in claim 1 in which the fibrous material is wood shavings.

7. The method defined in claim 1 in which the fibrous material is treated with ferrous chloride prior to being impregnated with the heavy-metal sulfate.

AUGUST SCHNELL.
ALEXANDER BOSSHARD.

REFERENCES CITED

The following references are of record in the file of this patent:

UNITED STATES PATENTS

| Number | Name | Date |
|---|---|---|
| 937,868 | Rosenleaf | Oct. 26, 1909 |
| 1,583,713 | Garrow | May 4, 1926 |

FOREIGN PATENTS

| Number | Country | Date |
|---|---|---|
| 278,788 | Great Britain | of 1927 |
| 455,571 | Great Britain | of 1936 |
| 843,851 | France | of 1939 |